United States Patent
Antia et al.

(10) Patent No.: US 9,871,578 B2
(45) Date of Patent: Jan. 16, 2018

(54) CLEAR SKY DETERMINATION IN UPLINK POWER CONTROL USING DUAL TIME CONSTANTS

(71) Applicant: Hughes Network Systems, LLC, Germantown, MD (US)

(72) Inventors: Yezdi Antia, North Potomac, MD (US); Walter Robert Kepley, III, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 440 days.

(21) Appl. No.: 14/446,933

(22) Filed: Jul. 30, 2014

(65) Prior Publication Data

US 2016/0037456 A1 Feb. 4, 2016

(51) Int. Cl.
*H04B 7/185* (2006.01)
*H04B 17/00* (2015.01)
(Continued)

(52) U.S. Cl.
CPC ................ *H04B 7/18517* (2013.01)

(58) Field of Classification Search
CPC ..... H04W 52/04; H04W 52/06; H04W 52/08; H04W 52/146; H04W 52/225; H04W 52/24; H04W 52/241; H04W 52/242; H04W 52/243; H04W 52/10; H04W 52/12; H04W 52/18; H04W 52/245; H04W 52/248; H04W 52/262; H04W 52/282; H04W 52/325; H04W 52/362; H04W 52/365; H04W 52/54; H04W 52/56; H04B 1/1027; H04B 1/26; H04B 17/20; H04B 17/29; H04B 17/309; H04B 7/18563;
(Continued)

(56) References Cited

U.S. PATENT DOCUMENTS

| | | | |
|---|---|---|---|
| 6,205,129 B1 * | 3/2001 | Esteves ................ | H04L 1/0002 370/331 |
| 6,374,096 B1 * | 4/2002 | Parr ...................... | H04W 52/24 342/359 |

(Continued)

OTHER PUBLICATIONS

PCT/US/2015/041608, International Search Report and Written Opinion of the International Searching Authority, dated Oct. 19, 2015.

*Primary Examiner* — Yuwen Pan
*Assistant Examiner* — Paul P Tran
(74) *Attorney, Agent, or Firm* — Edell, Shapiro & Finnan LLC; Richard C. Irving

(57) ABSTRACT

An uplink power control system and a machine-implemented method for determining clear sky and adjusting uplink power are provided. A receiving station, which may be a satellite terminal or a satellite gateway, receives a reference signal from a satellite. The reference signal may be sampled over a sampling time period in order to compute a filtered short-term average downlink SINR. A filtered long-term average downlink SINR may be adjusted toward the filtered short-term average downlink SINR using either a first time constant or second time constant, based on a relationship between the filtered long-term average downlink SINR and the filtered short-term average downlink SINR. In some implementations, the second time constant is less than the first time constant.

20 Claims, 3 Drawing Sheets

(51) Int. Cl.

| | | |
|---|---|---|
| *H04B 7/00* | (2006.01) | |
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04B 7/02* | (2017.01) | |
| *H04L 1/02* | (2006.01) | |
| *H04L 27/06* | (2006.01) | |

(58) Field of Classification Search
CPC .. H04B 7/2041; H04B 7/216; H04B 7/18506; H04B 7/18515; H04B 7/18541; H04B 7/18543; H04B 7/212; H04B 7/18513; H04B 7/18517; H04L 47/10; H04L 47/14; H04L 47/29; H04L 47/30; H04L 47/2433; H04L 47/2458
USPC ... 455/12.1, 13.4, 134, 226.1, 427, 505, 522
See application file for complete search history.

(56) References Cited

U.S. PATENT DOCUMENTS

| | | | |
|---|---|---|---|
| 6,542,558 B1* | 4/2003 | Schulist | H03M 13/2957 375/147 |
| 7,043,199 B2 | 5/2006 | Dai et al. | |
| 2002/0172166 A1* | 11/2002 | Arslan | H04L 1/20 370/317 |
| 2003/0058821 A1* | 3/2003 | Lee | H04W 52/24 370/335 |
| 2004/0127158 A1* | 7/2004 | Dai | H04B 7/18543 455/12.1 |
| 2004/0192196 A1* | 9/2004 | Kim | H04B 7/18513 455/12.1 |
| 2004/0213182 A1* | 10/2004 | Huh | H04L 1/0002 370/332 |
| 2008/0194199 A1 | 8/2008 | Martin et al. | |
| 2008/0233992 A1* | 9/2008 | Oteri | H04W 52/241 455/522 |
| 2011/0021137 A1* | 1/2011 | Laufer | H04B 7/212 455/13.4 |

* cited by examiner

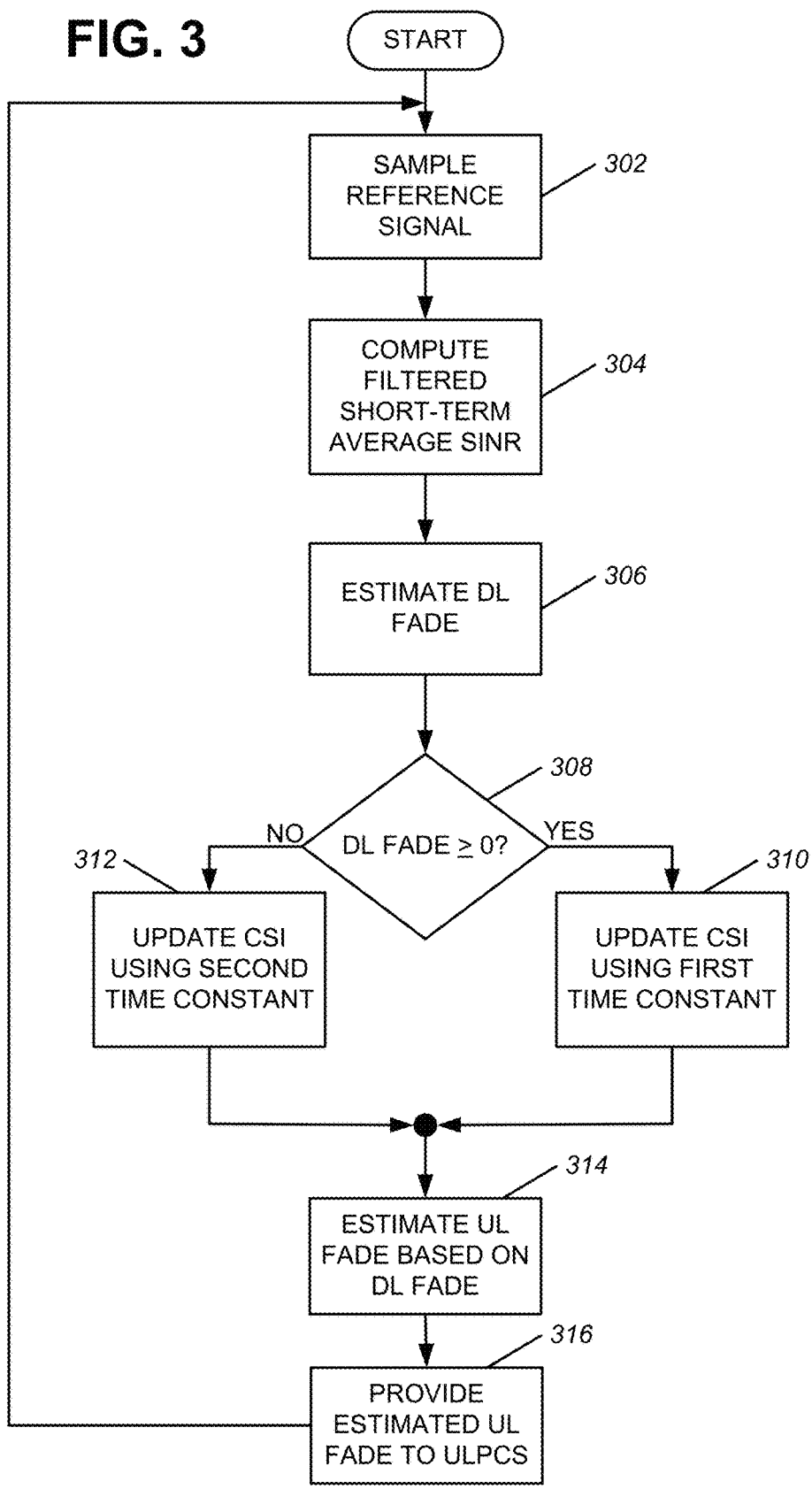

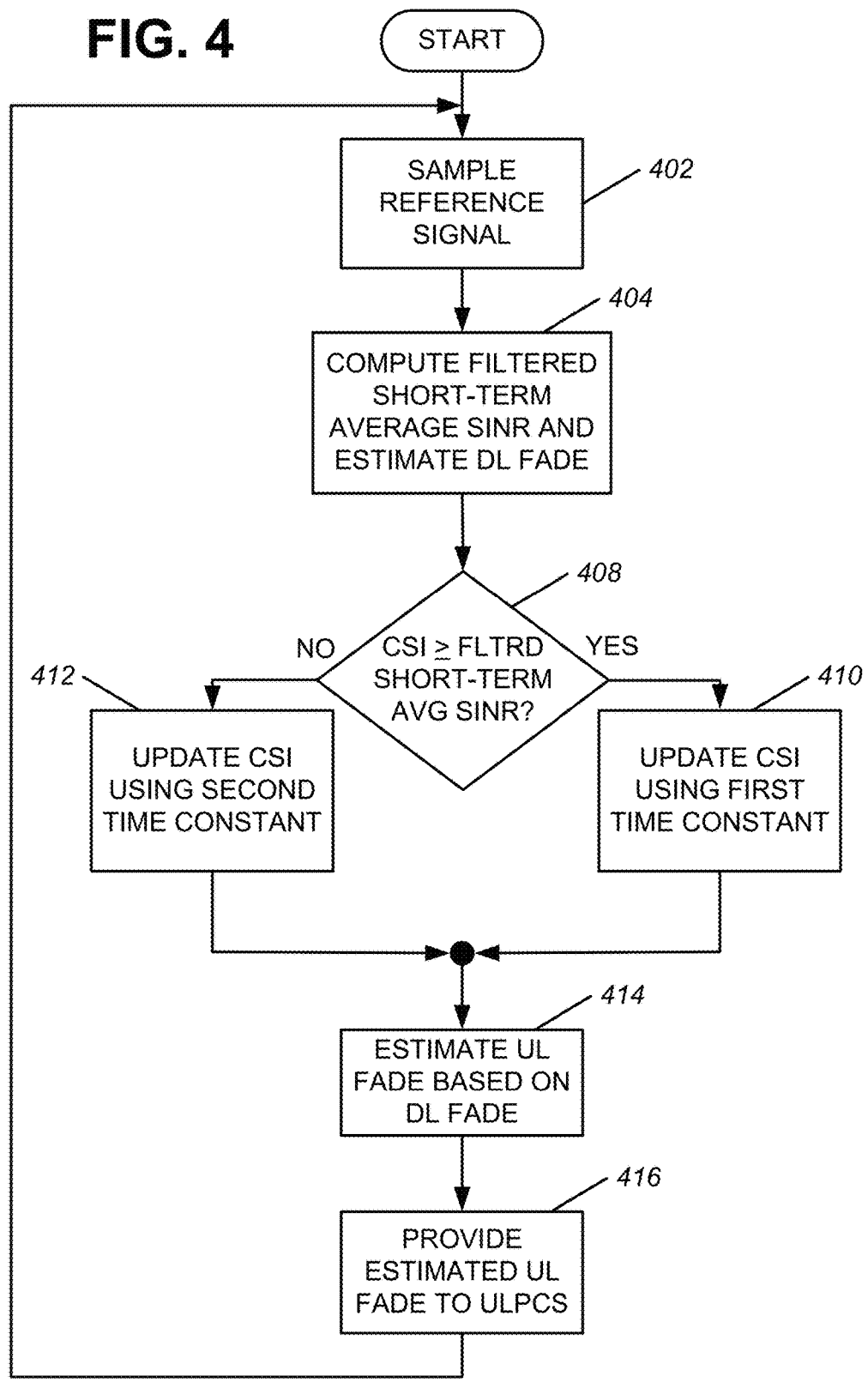

CLEAR SKY DETERMINATION IN UPLINK POWER CONTROL USING DUAL TIME CONSTANTS

FIELD OF THE INVENTION

The invention relates to an uplink power control system and more particularly to an uplink power control system that monitors a downlink signal-to-noise-plus-interference ratio (SINR), estimates downlink fade based on the downlink SINR and a filtered long-term average SINR, estimates uplink fade based on the estimated downlink fade, adjusts transmit power based on the estimated uplink fade, and updates the long-term average SINR using one of a plurality of time constants.

BACKGROUND

A current uplink power control system for satellite terminals in a satellite communication system monitors a beacon signal from a satellite. The beacon signal is held at a constant power level by the satellite. A filtered value of a long-term average downlink SINR is maintained by the satellite terminal to prevent the filtered value from changing dramatically due to continuous bad weather, such as, for example, continuous rain for a long time period. The filtered value of the long-term average of the downlink SINR is used as a clear sky indicator and is updated only when a filtered short-term average downlink SINR is less than the clear sky indicator by more than a threshold. In other words, if the filtered short-term average downlink SINR is less than the clear sky indicator by more than the threshold, then the uplink power control system would deem the satellite terminal to be experiencing downlink fade due to adverse weather conditions and the clear sky indicator would not be updated. When the filtered short-term average downlink SINR is not less than the clear sky indicator by more than a threshold, the clear sky indicator would be updated using a single time constant, which may be as long as seven or ten days.

Once the clear sky indicator has been established by the satellite terminal, if the downlink power from the satellite were to be adjusted in such a way that the new downlink SINR is greater than the clear sky indictor then the clear sky indicator would never converge to the new value. If the new SINR is less than the clear sky indicator then the clear sky indicator would converge to the new value but may take weeks (for example) during which period the terminal would perceive itself to be in a faded condition.

In a second uplink power control system, similar to the above mentioned uplink power control system, the clear sky indicator is updated using the single time constant, regardless of whether the filtered short-term average SINR is less than, greater than, or equal to the clear sky indicator.

Once the clear sky indicator has been established by the satellite terminal, if the downlink power from the satellite were to be adjusted then the clear sky indicator may take weeks (for example) to converge to the new value during which period the terminal would perceive itself to be in a faded condition.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

An uplink power control system and a machine-implemented method for determining clear sky and adjusting uplink power are provided.

In a first embodiment, a receiving station, which may be a satellite terminal or a satellite gateway, may receive a reference signal from a satellite. The reference signal may be sampled over a sampling time period in order to compute a filtered short-term average downlink SINR. A receiver of the receiving station may estimate a downlink fade of the reference signal based on a filtered long-term average downlink SINR and the filtered short-term average downlink SINR. When the estimated downlink fade is greater than zero, the filtered long-term average downlink SINR may be adjusted toward the filtered short-term average downlink SINR based, at least partly, on a value of a first time constant. When the estimated downlink fade is less than zero, the filtered long-term average downlink SINR may be adjusted toward the filtered short-term average downlink SINR based, at least partly, on a value of a second time constant, which is different from the first time constant. In some implementations, the second time constant is less than the first time constant.

In variations of the first embodiment, the filtered long-term average downlink SINR may be adjusted by either a programmable device or an application specific integrated circuit (ASIC) included in a receiver of the receiving station. Further, the reference signal may be a beacon signal from a satellite or a signal conforming to a DVB-S standard, a DVB-S2X standard, or a DVB-S2 standard, which is repeated by the satellite. In some implementations, updating of the filtered long-term average downlink SINR may be performed according to a first order infinite impulse response filter. In other implementations, updating of the filtered long-term average downlink SINR may be performed according to a second order infinite impulse response filter.

In a second embodiment, a receiving station is provided. The receiving station may be either a satellite terminal or a satellite gateway. The receiving station may include either a programmable processing device or an application specific integrated circuit and is operable to transmit uplink signals to and receive downlink signals from a satellite. A value of a filtered short-term average downlink SINR may be produced by a processing device or an application specific integrated circuit based on samples of a reference signal over a sampling time period. Either the processing device or the application specific integrated circuit may update a value of the filtered long-term average downlink SINR based on the value of the filtered short-term average downlink SINR. A power control module may adjust a transmit power for an uplink signal based on the value of the updated filtered long-term average downlink SINR and the value of the filtered short-term average downlink SINR. When the value of the filtered long-term average downlink SINR is greater than the value of the filtered short-term average downlink SINR, the programmable processing device or the application specific integrated circuit may adjust the filtered long-term average downlink SINR toward the filtered short-term average downlink SINR at a first rate based on a first time constant. When the value of the filtered long-term average downlink SINR is not greater than or equal to the value of the filtered short-term average downlink SINR, the programmable processing device or the application specific integrated circuit may adjust the filtered long-term average downlink SINR toward the filtered short-term average SINR at a second rate based on a second time constant. The value of the second time constant is different from the value of the first time constant. In some implementations, the value of the second time constant is less than the value of the first time constant.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 3 is a flowchart of an exemplary process that may be implemented in an embodiment of the invention.

FIG. 4 is a flowchart of another exemplary process that may be implemented in another embodiment of the invention.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In various embodiments of the invention, a filtered long-term average downlink SINR may be used as a clear sky indicator. When a satellite gateway or a satellite terminal is ranged, a filtered long-term average downlink SINR is reset and a filtered short-term average downlink SINR is reset. However, once the filtered long-term average SINR (or clear sky indicator) is established, then if the downlink carrier power changes due to rebalancing or noise/interference floor changes, then the filtered long-term average downlink SINR adapts to the changes.

Various embodiments of the invention provide an uplink power control system for use in a satellite gateway or a satellite terminal. The uplink power control system tracks a filtered long-term average downlink SINR, which may be used as the clear sky indicator. The filtered long-term average downlink SINR may be updated using one of two time constants. A first time constant may be long, such as, for example, one week, ten days or another suitable time period, and may be used during updating of the filtered long-term average downlink SINR when a filtered short-term downlink SINR is less than or equal to the filtered long-term average downlink SINR. A second time constant may be shorter than the first time constant, such as, for example, three days or another suitable time period, and may be used when updating the filtered long-term average downlink SINR when the filtered short-term average downlink SINR is not less than or equal to the filtered long-term average downlink SINR. As a result, the filtered long-term average downlink SINR converges more quickly if the filtered short-term average downlink SINR is greater than the filtered long-term average downlink SINR, and the filtered long-term average downlink SINR converges relatively slowly if the filtered short-term average downlink SINR is less than the filtered long-term average downlink SINR.

The various embodiments prevent the long-term average downlink SINR from diverging, under deep and prolonged rain fades, from a true clear sky value.

Downlink fade may be estimated based on a difference between the filtered long-term average downlink SINR and the filtered short-term average downlink SINR. Uplink fade may be estimated based on the estimated downlink fade, and transmit and receive frequencies. The uplink power may be adjusted based on the estimated uplink fade.

Exemplary Operating Environment

Figure 1:
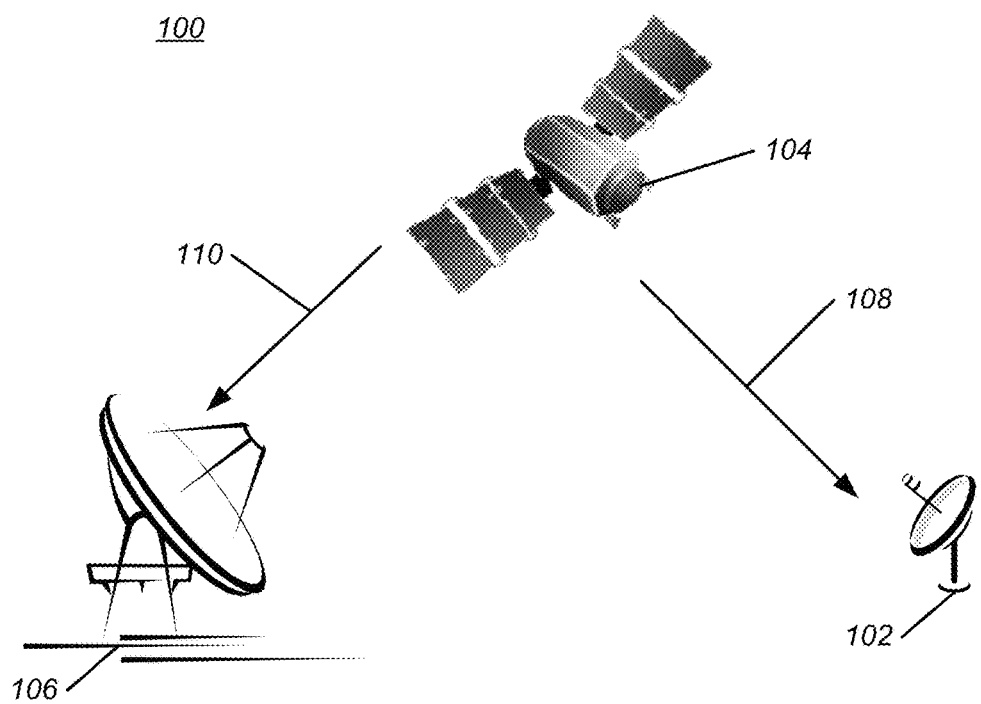
FIG. 1 illustrates an exemplary operating environment 100 in which embodiments of the invention may operate.

FIG. 1 illustrates an exemplary operating environment 100, in which various embodiments may operate. Exemplary operating environment 100 may include a satellite 104 in an orbit, a satellite gateway 106, and a satellite terminal 102. In some embodiments, satellite terminal 102 may be a very small aperture terminal (VSAT).

In some embodiments, satellite terminal 102 may receive a reference signal 108 from satellite 104. The reference signal may be held at a constant power level by satellite 104 via use of automatic level control. The reference signal may be a beacon signal from satellite 104 or a signal conforming to a DVB-S standard, a DVB-S2X standard, or a DVB-S2. The beacon signal may be generated by satellite 104. The signal conforming to the DVB-S standard, the DVB-S2X standard, or the DVB-S2 standard may originate from satellite gateway 106 and may be repeated, at the constant power level, by satellite 104.

In other embodiments, satellite gateway 106 may receive a reference signal 110 from satellite 104. The reference signal may be held at a constant power level by satellite 104 via use of automatic level control. The reference signal may be a beacon signal from satellite 104 or a signal conforming to a DVB-S standard, a DVB-S2X standard, or a DVB-S2. The beacon signal may be generated by satellite 104. The signal conforming to the DVB-S standard, the DVB-S2X standard, or the DVB-S2 standard may originate from satellite terminal 102 and may be repeated, at the constant power level, by satellite 104.

Exemplary Receiver and Transmitter

Figure 2:
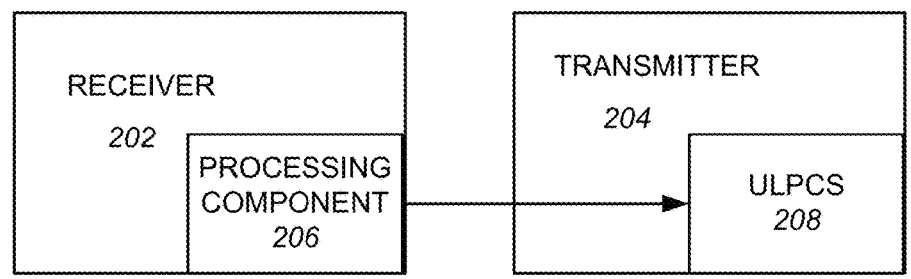
FIG. 2 illustrates an exemplary receiver and transmitter of a receiving station, which may be either a satellite terminal or a satellite gateway.

FIG. 2 illustrates an exemplary receiver 202 and an exemplary transmitter 204, which may be included in satellite gateway 106 or satellite terminal 102. Receiver 202 may include a processing component 206, which may include either a programmable processing device or an application specific integrated circuit (ASIC). Transmitter 204 may include an uplink power control system (ULPCS) 208, which may include a power control module.

In some embodiments, processing component 206 may receive a reference signal from satellite 104, may estimate a downlink fade based on the received reference signal, may estimate an uplink fade based on the downlink fade and the transmit and receive frequencies, and may provide the estimated uplink fade to ULPCS 208.

ULPCS 208 may adjust uplink signal power based on the estimated uplink fade. In some embodiments, the uplink signal power may be digitally controlled within processing component 206 by sending commands from processing component 206 to a variable gain attenuator in an indoor receiver unit or an outdoor receiver unit. In some embodiments, satellite gateway 106 may control attenuation at an output of high power amplifiers.

The reference signal may be a beacon signal generated by satellite 104, which holds the beacon signal at a constant power level. In some embodiments, the reference signal may conform to the DVB-S standard, the DVB-S2X standard, or the DVB-S2 standard, may originate from satellite terminal 104 (when receiver 202 and transmitter 204 are included in satellite gateway 106), or may originate from satellite gateway 106 (when receiver 202 and transmitter 204 are included in satellite terminal 102), and may be repeated, at the constant power level, by satellite 104.

In alternate embodiments, processing component 206 may provide the estimated downlink fade to ULPCS 208, which may estimate the uplink fade and adjust uplink signal power based on the estimated uplink fade.

Exemplary Processes

FIG. 3 illustrates a flowchart for an exemplary process which may be performed in some embodiments of the invention. The process may be implemented in either satellite terminal 102 or satellite gateway 106. In order to simplify the explanation of the following processes, a term, "receiving station" is used. In this specification, "receiving station" may be either satellite terminal 102 or satellite gateway 106.

The process of FIG. 3 may begin with processing component 206 of the receiving station receiving a reference signal. In some embodiments, the reference signal may be a beacon signal generated by satellite 104, which maintains the beacon signal at a constant power level. Satellite 104 may use automatic level control to maintain the constant power level of the beacon signal. In other embodiments, the reference signal, which may conform to a DVB-S standard, a DVB-S2 standard or a DVB-S2X standard, may be maintained at a constant power level by satellite 104.

When the receiving station is satellite terminal 102 and the reference signal conforms to the DVB-S standard, the DVB-S2 standard or the DVB-S2X standard, the reference signal may originate from satellite gateway 106 and may be repeated by satellite 104 to satellite terminal 102. Satellite 104 may hold the repeated reference signal at a constant power level by using automatic level control.

When the receiving station is satellite gateway 106 and the reference signal conforms to the DVB-S standard, the DVB-S2 standard or the DVB-S2X standard, the reference signal may originate from satellite terminal 102 and may be repeated by satellite 104 to satellite gateway 106. Satellite 104 may hold the repeated reference signal at a constant power level by using automatic level control.

Processing component 206 may receive the reference signal (act 302) and may compute a filtered short-term average downlink SINR based on sampling the received reference signal at a long-term decimation rate of $D_{L\_avg}$ over a sampling time period, such as 250 milliseconds, 1 second, or another suitable time period (act 304). The filtered short-term average downlink SINR may be expressed as $$\left[\frac{C}{N+I}(+)\right]_{DL}^{D_{L\_avg}},$$

which is a decimated sequence of downlink SINR measurements, $$\frac{C}{N+I}$$

is a signal-to-noise-plus-interference ratio, and DL is a downlink.

Processing component 206 may maintain a filtered long-term average downlink SINR, which may be used as a clear sky indicator. The filtered long-term average downlink SINR may be expressed as $$\left[\frac{C}{N+I}(+)\right]_{DL}^{L_{avg}}.$$

Processing component 206 may estimate a downlink fade based on subtracting the filtered short-term average downlink SINR from the filtered long-term average downlink SINR (act 306), which may be expressed as $$\left[\frac{C}{N+I}(+)\right]_{DL}^{L_{avg}} - \left[\frac{C}{N+I}(+)\right]_{DL}^{D_{L\_avg}} = F_{DL},$$

where $F_{DL}$ is downlink fade.

Next, processing component 206 may determine whether the estimated downlink fade is greater than or equal to zero (act 308). If the downlink fade is determined to be greater than or equal to zero, then processing component 206 may update the clear sky indicator (the filtered long-term average downlink SINR) using a first time constant (act 310). Otherwise, processing component 206 may update the clear sky indicator using a second time constant, which has a different value than a value of the first time constant (act 312). Following this, processing component 206 may save the updated clear sky indicator as a previous clear sky indicator to prepare for the next update operation. This may be expressed as:

if $F_{DL} \geq 0$, then $$\left[\frac{C}{N+I}(+)\right]_{DL}^{L_{avg}} =$$

$$\alpha_{L\_avg\_dn} \cdot \left[\frac{C}{N+I}(-)\right]_{DL}^{L_{avg}} + (1 - \alpha_{L\_avg\_dn}) \cdot \left[\frac{C}{N+I}(+)\right]_{DL}^{D_{L\_avg}}$$

else $$\left[\frac{C}{N+I}(+)\right]_{DL}^{L_{avg}} =$$

$$\alpha_{L\_avg\_up} \cdot \left[\frac{C}{N+I}(-)\right]_{DL}^{L_{avg}} + (1 - \alpha_{L\_avg\_up}) \cdot \left[\frac{C}{N+I}(+)\right]_{DL}^{D_{L\_avg}}$$

$$\left[\frac{C}{N+I}(-)\right]_{DL}^{L_{avg}} = \left[\frac{C}{N+I}(+)\right]_{DL}^{L_{avg}}$$

where $\left[\frac{C}{N+I}(-)\right]_{DL}^{L_{avg}}$ is a previous value of the filtered long-term average downlink SINR, $$\left[\frac{C}{N+I}(+)\right]_{DL}^{D_{l\_avg}}$$

is a new value of the filtered short-term average downlink SINR, $$\left[\frac{C}{N+I}(+)\right]_{DL}^{L_{avg}}$$

is an updated value of the filtered long-term average downlink SINR, $\alpha_{l\_avg\_dn}$ is the first time constant, $\alpha_{l\_avg\_up}$ is the second time constant, $$\alpha_{l\_avg\_dn} = 1 - \frac{t_S \cdot D_{l\_avg}}{\tau_{l\_avg\_dn}},$$

where $t_S$ is a sampling time period, $D_{l\_avg}$ is a long-term decimation rate, $\tau_{l\_avg\_dn}$ is the first time constant, and $$\alpha_{l\_avg\_up} = 1 - \frac{t_S \cdot D_{l\_avg}}{\tau_{l\_avg\_up}},$$

where $\tau_{l\_avg\_up}$ is the second time constant.

In various embodiments, the first time constant may be a time period of seven days, 10 days, or another suitable time period, and the second time constant may have a value shorter than a value of the first time constant, such as, for example, three days or another suitable time period. As a result, when the downlink fade is greater than or equal to zero, the clear sky indicator converges more slowly than when the downlink fade is determined to be less than zero.

Processing component 206 may then estimate uplink fade based on the estimated downlink fade, the transmit frequency and the receive frequency (act 314). The estimated uplink fade may then be provided to a processing device of ULPCS 208, which may adjust uplink signal power based on the estimated uplink fade (act 316). The process may then be repeated.

In an alternate embodiment, the estimated downlink fade may be provided to ULPCS 208, which may estimate the uplink fade based on the estimated downlink fade, the transmit frequency, and the receive frequency, and may adjust the uplink signal power based on the estimated uplink fade.

FIG. 4 illustrates a flowchart for a second exemplary process which may be performed in some embodiments of the invention. The process may be implemented in either satellite terminal 102 or satellite gateway 106.

The process of FIG. 4 may begin with processing component 206 of the receiving station receiving a reference signal. In some embodiments, the reference signal may be a beacon signal generated by satellite 104, which maintains the beacon signal at a constant power level. Satellite 104 may use automatic level control to maintain the constant power level of the beacon signal. In other embodiments, the reference signal may conform to a DVB-S standard, a DVB-S2 standard or a DVB-S2X standard and may be maintained at a constant power level via use of automatic level control by satellite 104.

When the receiving station is satellite terminal 102 and the reference signal conforms to the DVB-S standard, the DVB-S2 standard or the DVB-S2X standard, the reference signal may originate at satellite gateway 106 and may be repeated by satellite gateway 104 to satellite terminal 102. Satellite 104 may hold the reference signal at a constant power level by using automatic level control.

When the receiving station is satellite gateway 106 and the reference signal conforming to the DVB-S standard, the DVB-S2 standard or the DVB-S2X standard. The reference signal may originate from satellite terminal 102 and may be repeated by satellite 104 to satellite gateway 106. Satellite 104 may hold the repeated reference signal at a constant power level by using automatic level control.

Processing component 206 may sample the reference signal over a short time period, which may be a predefined time period, such as, for example, 250 milliseconds, 1 second, or another suitable time period (act 402), and may determine a filtered short-term average downlink SINR, (act 404). The filtered long-term average downlink SINR may be determined based on sampling the received reference signal at a long-term decimation rate of $D_{l\_avg}$ over a sampling time period, which may be 250 milliseconds, 1 second, or another suitable time period. The downlink fade may be estimated based on a difference between a filtered long-term average downlink SINR, which may be used as a clear sky indicator, and the filtered short-term average downlink SINR.

Processing component 206 may maintain the filtered long-term average downlink SINR (clear sky indicator) and may determine whether the clear sky indicator is greater than or equal to the filtered short-term average downlink SINR (act 408). If the clear sky indicator is determined to be greater than or equal to the filtered short-term average downlink SINR, then processing component 206 may update the clear sky indicator using a first time constant (act 410). Otherwise, processing component 206 may update the clear sky indicator using a second time constant, which has a different value than a value of the first time constant (act 412). Following this, processing component 206 may save the updated clear sky indicator as a previous clear sky indicator to prepare for the next update operation.

In various embodiments, the first time constant may be a time period of seven days, 10 days, or another suitable time period, and the second time constant may have a value shorter than a value of the first time constant, such as, for example, three days or another suitable time period. As a result, when the clear sky indicator is greater than or equal to the filtered short-term average downlink SINR, the clear sky indicator converges more slowly than when the clear sky indicator is less than the filtered short-term average downlink SINR. This may be expressed as:

$$\text{If } \left[\frac{C}{N+I}(-)\right]_{DL}^{L_{avg}} \geq \left[\frac{C}{N+I}(+)\right]_{DL}^{D_{l\_avg}} \text{ then}$$

-continued $$\left[\frac{C}{N+I}(+)\right]_{DL}^{L\_avg} =$$
$$\alpha_{L\_avg\_dn} \cdot \left[\frac{C}{N+I}(-)\right]_{DL}^{L\_avg} + (1-\alpha_{L\_avg\_dn}) \cdot \left[\frac{C}{N+I}(+)\right]_{DL}^{D\_L\_avg}$$

Else $$\left[\frac{C}{N+I}(+)\right]_{DL}^{L\_avg} =$$
$$\alpha_{L\_avg\_up} \cdot \left[\frac{C}{N+I}(-)\right]_{DL}^{L\_avg} + (1-\alpha_{L\_avg\_up}) \cdot \left[\frac{C}{N+I}(+)\right]_{DL}^{D\_L\_avg}$$

$$\left[\frac{C}{N+I}(-)\right]_{DL}^{L\_avg} = \left[\frac{C}{N+I}(+)\right]_{DL}^{L\_avg}$$

where $\left[\frac{C}{N+I}(-)\right]_{DL}^{L\_avg}$ is a previous value of the filtered long-term average downlink SINR, $$\left[\frac{C}{N+I}(+)\right]_{DL}^{D\_L\_avg}$$

is a new value of the filtered short-term average downlink SINR, $$\left[\frac{C}{N+I}(+)\right]_{DL}^{L\_avg}$$

is an updated value of the filtered long-term average downlink SINR, $\alpha_{L\_avg\_dn}$ is the first time constant, $\alpha_{L\_avg\_up}$ is the second time constant, $$\alpha_{L\_avg\_dn} = 1 - \frac{t_S \cdot D_{L\_avg}}{\tau_{L\_avg\_dn}},$$

where $t_S$ is a sampling time period, $D_{L\_avg}$ is a long-term decimation rate, and $\tau_{L\_avg\_dn}$ is the first time constant, and $$\alpha_{L\_avg\_up} = 1 - \frac{t_S \cdot D_{L\_avg}}{\tau_{L\_avg\_up}},$$

where $\tau_{L\_avg\_up}$ is the second time constant.

Processing component 206 may then estimate uplink fade based on the estimated downlink fade, the transmit frequency and the receive frequency (act 414). The estimated uplink fade may then be provided to a processing device of ULPCS 208, which may adjust uplink power based on the estimated uplink fade (act 416). The process may then be repeated.

In an alternate embodiment, the estimated downlink fade may be provided to the processing device of ULPCS 208, which may estimate the uplink fade based on the estimated downlink fade, the transmit frequency and the receive frequency, and may adjust the uplink power based on the estimated uplink fade.

The abovementioned embodiments are only exemplary. In other embodiments, instead of using a first order infinite impulse response (IIR) filter to update the filtered long-term average downlink SINR or the filtered short term average downlink SINR, other methods of updating the filtered long-term average downlink SINR or the filtered short-term average downlink SINR may be employed, such as, for example, a second order infinite impulse response (IIR) filter, a block average, a moving average or other suitable method.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A machine-implemented method for determining clear sky in uplink power control, the method comprising:
    receiving, by a receiver at a receiving station, a reference signal from a satellite, the receiving station being either a satellite terminal or a satellite gateway;
    computing, by a component of the receiver, a filtered short-term average downlink signal-to-noise-plus-interference ratio based on samples of the received reference signal over a sampling time period;
    estimating, by the component of the receiver, a downlink fade based on a filtered long-term average downlink signal-to-noise-plus-interference ratio and the filtered short-term average downlink signal-to-noise-plus-interference ratio;
    when the estimated downlink fade is greater than zero, adjusting, by the receiver, the filtered long-term average downlink signal-to-noise-plus-interference ratio toward the filtered short-term average downlink signal-to-noise-plus-interference ratio based, at least partly, on a value of a first time constant;
    when the estimated downlink fade is less than zero, adjusting, by the receiver, the filtered long-term average downlink signal-to-noise-plus-interference ratio toward the filtered short-term average downlink signal-to-noise-plus-interference ratio based, at least partly, on a value of a second time constant, the value of the second time constant being a different value from the value of the first time constant; and
    adjusting, by the receiving station, the uplink power control based on the adjusted filtered long-term average downlink signal-to-noise-plus interference ratio and the filtered short-term average downlink signal-to-noise-plus-interference ratio, wherein:
    when the estimated downlink fade is greater than zero, the adjusting causes the filtered long-term average downlink signal-to-noise-plus-interference ratio to converge toward the filtered short-term average downlink signal-to-noise-plus interference ratio at a first rate, and when the estimated downlink fade is less than zero, the adjusting causes the filtered long-term average downlink signal-to-noise-plus-interference ratio to converge toward the filtered short-term average downlink signal-to-noise-plus interference ratio at a second rate that is different from the first rate.

2. The machine-implemented method of claim 1, wherein the reference signal received by the receiving station is held at a constant power level.

3. The machine-implemented method of claim 1, wherein the value of the second time constant is less than the value of the first time constant.

4. The machine-implemented method of claim 1, wherein the adjusting of the filtered long-term average downlink signal-to-noise-plus-interference ratio is performed by an application specific integrated circuit of the receiver.

5. The machine-implemented method of claim 1, wherein:
the adjusting the long-term average downlink signal-to-noise-plus-interference ratio toward the filtered short-term average downlink signal-to-noise-plus-interference ratio based, at least partly, on a value of a first time constant further comprises:

$$\left[\frac{C}{N+I}(+)\right]_{DL}^{L\_avg} = $$
$$\alpha_{l\_avg\_dn} \cdot \left[\frac{C}{N+I}(-)\right]_{DL}^{L\_avg} + (1 - \alpha_{l\_avg\_dn}) \cdot \left[\frac{C}{N+I}(+)\right]_{DL}^{D_{l\_avg}},$$

where the $\alpha_{l\_avg\_dn}$ is a first coefficient, the $$\left[\frac{C}{N+I}(-)\right]_{DL}^{L\_avg}$$

is a last computed value of the long-term average downlink signal-to-noise-plus-interference ratio, the $$\left[\frac{C}{N+I}(+)\right]_{DL}^{D_{l\_avg}}$$

is a current value of the filtered short-term average downlink signal-to-noise-plus-interference ratio, the $$\left[\frac{C}{N+I}(+)\right]_{DL}^{L\_avg}$$

is an updated value the long-term average downlink signal-to-noise-plus-interference ratio, $D_{l\_avg}$ is a decimation rate with respect to sampling of the reference signal, and the DL refers to a downlink; and the adjusting the long-term average downlink signal-to-noise-plus-interference ratio toward the filtered short-term average downlink signal-to-noise-plus-interference ratio based, at least partly, on a second time constant further comprises:

$$\left[\frac{C}{N+I}(+)\right]_{DL}^{L\_avg} =$$

$$\alpha_{l\_avg\_up} \cdot \left[\frac{C}{N+I}(-)\right]_{DL}^{L\_avg} + (1 - \alpha_{l\_avg\_up}) \cdot \left[\frac{C}{N+I}(+)\right]_{DL}^{D_{l\_avg}},$$

where $\alpha_{l\_avg\_up}$ is a second coefficient.

6. The machine-implemented method of claim 5, wherein:
the $$\alpha_{l\_avg\_dn} = 1 - \frac{t_s \cdot D_{l\_avg}}{\tau_{l\_avg\_dn}},$$

where the $t_s$ is a sampling time, the $D_{l\_avg}$ is a long-term decimation rate, and the $\tau_{l\_avg\_dn}$ is the first time constant, and
the $$\alpha_{l\_avg\_up} = 1 - \frac{t_s \cdot D_{l\_avg}}{\tau_{l\_avg\_up}},$$

where $\tau_{l\_avg\_up}$ is the second time constant.

7. The machine-implemented method of claim 1, wherein:
the receiving station is the satellite terminal, and
the reference signal is a signal which conforms to a DVB-S standard, a DVB-S2X standard, or a DVB-S2 standard.

8. The machine-implemented method of claim 1, wherein:
the receiving station is the satellite terminal, and
the reference signal is a beacon signal from the satellite.

9. The machine-implemented method of claim 1, wherein:
the receiving station is the satellite gateway, and
the reference signal is a beacon signal from the satellite.

10. An uplink power control system for use in a satellite terminal or a satellite gateway, the uplink power control system comprising:
a receiving station operable to transmit uplink signals to and receive downlink signals from a satellite and comprising a programmable processing device or an application specific integrated circuit, the receiving station being either the satellite terminal or the satellite gateway;
the programmable processing device or the application specific integrated circuit produces a value of a filtered short-term average downlink signal-to-noise-plus-interference ratio based on samples of a reference signal over a sampling time period, the processing device or the application specific integrated circuit updates a value of a filtered long-term average downlink signal-to-noise-plus-interference ratio based on the value of the filtered short-term average downlink signal-to-noise-plus-interference ratio;
a power control module adjusts transmit power for the uplink signals based on the updated value of the filtered long-term average downlink signal-to-noise-plus-interference ratio and the filtered short-term average downlink signal-to-noise-plus-interference ratio received from the processing device or the application specific integrated circuit, wherein:
when the value of the filtered long-term average downlink signal-to-noise-plus-interference ratio is greater than the value of the filtered short-term average downlink signal-to-noise-plus-interference ratio, the programmable processing device or the application specific integrated circuit adjusts the filtered long-term average downlink signal-to-noise-plus-interference ratio toward the filtered short-term average downlink signal-to-noise-plus-interference ratio at a first rate based on a first time constant, and when the value of the filtered long-term average downlink signal-to-noise-plus-interference ratio is not greater than or equal to the value of the filtered short-term average downlink signal-to-noise-plus-interference ratio, the programmable processing device or the application specific integrated circuit adjusts the filtered long-term average downlink signal-to-noise-plus-interference ratio toward the filtered short-term average downlink signal-to-noise-plus-interference ratio at a second rate based on a second time constant, a value of the second time constant being different from a value of the first time constant and the first rate being different from the second rate.

11. The uplink power control system of claim 10, wherein the second rate is faster than the first rate.

12. The uplink power control system of claim 10, wherein:
the receiving station is a satellite terminal,
the reference signal received by the satellite terminal is held at a constant power level and conforms to a DVB-S standard, a DVB-S2 standard or a DVB-S2X standard, and
the reference signal originates from a satellite gateway and is repeated by the satellite.

13. The uplink power control system of claim 10, wherein:
the receiving station is a satellite terminal, and
the reference signal received by the satellite terminal is held at a constant power level and is a beacon signal received from the satellite.

14. The uplink power control system of claim 13, wherein the beacon signal is generated by the satellite.

15. The uplink power control system of claim 10, wherein:
when the filtered long-term average downlink signal-to-noise-plus-interference ratio is greater than the filtered short-term average downlink signal-to-noise-plus-interference ratio, the programmable processing device or the application specific integrated circuit adjusts the filtered long-term average downlink signal-to-noise-plus-interference ratio according to:

$$\left[\frac{C}{N+I}(+)\right]_{DL}^{L\_avg} =$$

$$\alpha_{l\_avg\_dn} \cdot \left[\frac{C}{N+I}(-)\right]_{DL}^{L\_avg} + (1-\alpha_{l\_avg\_dn}) \cdot \left[\frac{C}{N+I}(+)\right]_{DL}^{D_{l\_avg}},$$

where the $\alpha_{l\_avg\_dn}$ is a first coefficient, the $$\left[\frac{C}{N+I}(-)\right]_{DL}^{L\_avg}$$

is a last computed value of the filtered long-term average downlink signal-to-noise-plus-interference ratio, the $$\left[\frac{C}{N+I}(+)\right]_{DL}^{D_{l\_avg}}$$

is a current value of the filtered short-term average downlink signal-to-noise-plus-interference ratio, the $$\left[\frac{C}{N+I}(+)\right]_{DL}^{L\_avg}$$

is an updated value of the filtered long-term average downlink signal-to-noise-plus-interference ratio, the $D_{l\_avg}$ is a decimation rate, and the DL refers to a downlink, and when the filtered long-term average downlink signal-to-noise-plus-interference ratio is not greater than the filtered short-term average downlink signal-to-noise-plus-interference ratio, the programmable processing device or the application specific integrated circuit adjusts the filtered long-term average downlink signal-to-noise-plus-interference ratio according to:

$$\left[\frac{C}{N+I}(+)\right]_{DL}^{L\_avg} =$$

$$\alpha_{l\_avg\_up} \cdot \left[\frac{C}{N+I}(-)\right]_{DL}^{L\_avg} + (1-\alpha_{l\_avg\_up}) \cdot \left[\frac{C}{N+I}(+)\right]_{DL}^{D_{l\_avg}},$$

where $\alpha_{l\_avg\_up}$ is a second coefficient.

16. The uplink power control system of claim 15, wherein:
the $$\alpha_{l\_avg\_dn} = 1 - \frac{t_s \cdot D_{l\_avg}}{\tau_{l\_avg\_dn}},$$

where the $\tau_s$ is a sampling time, the $D_{l\_avg}$ is the decimation rate, and the $\tau_{l\_avg\_dn}$ is the first time constant, and
the $$\alpha_{l\_avg\_up} = 1 - \frac{t_s \cdot D_{l\_avg}}{\tau_{l\_avg\_up}},$$

where $\tau_{l\_avg\_up}$ is the second time constant, the second time constant being less than the first time constant.

17. The uplink power control system of claim 10, wherein:
the receiving station is a satellite terminal,
and the reference signal is either a beacon signal or a signal conforming to a standard from a group of standards consisting of a DVB-S standard, a DVB-S2X standard, and a DVB-S2 standard.

18. The uplink power control system of claim 10, wherein:
the receiving station is a satellite gateway, and
the reference signal is a beacon signal from the satellite.

19. The uplink power control system of claim 10, wherein:
the receiving station is a satellite gateway,
the reference signal is a beacon signal from the satellite, and
the beacon signal is held at a constant power level by the satellite.

20. The uplink power control of claim 19, wherein the beacon signal originates from the satellite.

* * * * *